(12) United States Patent
Yamada (10) Patent No.: US 8,941,582 B2
(45) Date of Patent: Jan. 27, 2015

(54) ELECTROPHORETIC DISPLAY DEVICE, ELECTRONIC APPARATUS, AND METHOD OF MANUFACTURING ELECTROPHORETIC DISPLAY DEVICE

(75) Inventor: Hiroyasu Yamada, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 1330 days.

(21) Appl. No.: 12/643,178

(22) Filed: Dec. 21, 2009

(65) Prior Publication Data

US 2010/0177032 A1 Jul. 15, 2010

(30) Foreign Application Priority Data

Jan. 9, 2009 (JP) .................................. 2009-003252
Aug. 10, 2009 (JP) .................................. 2009-185490

(51) Int. Cl.
*G09G 3/34* (2006.01)
*G02F 1/167* (2006.01)

(52) U.S. Cl.
CPC ..................................... *G02F 1/167* (2013.01)
USPC ........... 345/107; 345/105; 359/296; 359/228; 347/6; 347/7; 347/8

(58) Field of Classification Search
USPC ............. 345/107, 105; 359/296, 228; 430/32; 264/4; 349/86; 347/6–8
See application file for complete search history.

(56) References Cited

U.S. PATENT DOCUMENTS

| | | | | |
|---|---|---|---|---|
| 5,724,187 | A * | 3/1998 | Varaprasad et al. | 359/608 |
| 6,001,544 | A * | 12/1999 | Makuta et al. | 430/405 |
| 6,219,127 | B1 * | 4/2001 | Hirakata et al. | 349/153 |
| 6,816,303 | B2 * | 11/2004 | Ukigaya | 359/296 |
| 7,456,430 | B1 * | 11/2008 | Yamazaki et al. | 257/72 |
| 7,733,323 | B2 * | 6/2010 | Togano et al. | 345/107 |
| 8,395,746 | B2 | 3/2013 | Hosoya | |
| 2003/0099027 | A1 * | 5/2003 | Shigehiro et al. | 359/296 |
| 2005/0104844 | A1 * | 5/2005 | Nakai et al. | 345/107 |
| 2007/0040798 | A1 * | 2/2007 | Kawai | 345/107 |
| 2007/0177092 | A1 * | 8/2007 | Hosoya | 349/149 |
| 2008/0160871 | A1 * | 7/2008 | Ota et al. | 445/25 |
| 2008/0297881 | A1 * | 12/2008 | Kobayashi et al. | 359/296 |
| 2009/0237352 | A1 * | 9/2009 | Abe et al. | 345/107 |
| 2010/0243156 | A1 * | 9/2010 | Yonemoto | 156/305 |

FOREIGN PATENT DOCUMENTS

| | | |
|---|---|---|
| JP | 2003-140197 A | 5/2003 |
| JP | 2005-114822 A | 4/2005 |
| JP | 2007-233349 A | 9/2007 |
| JP | 2008-233591 A | 10/2008 |

* cited by examiner

*Primary Examiner* — Jason Olson
*Assistant Examiner* — Linh N Hoffner
(74) *Attorney, Agent, or Firm* — ALG Intellectual Property, LLC (57) ABSTRACT

An electrophoretic display device includes: first and second substrates; an electrophoretic layer which is interposed between the first and second substrates; and a third substrate which is disposed opposite the first substrate with the second substrate interposed therebetween, which is joined to the first substrate with a sealing member interposed therebetween, and which seals the electrophoretic layer with the second substrate interposed therebetween. The first and third substrates have extension sections extending with respect to the second substrate in a plan view. The sealing member fills a part of a gap between the extension section of the first substrate and the extension section of the third substrate, and the sealing member does not come into contact with an outer edge of the third substrate.

9 Claims, 6 Drawing Sheets

CONVENTIONAL ART

US 8,941,582 B2

ELECTROPHORETIC DISPLAY DEVICE, ELECTRONIC APPARATUS, AND METHOD OF MANUFACTURING ELECTROPHORETIC DISPLAY DEVICE

BACKGROUND

1. Technical Field

The present invention relates an electrophoretic display device, an electronic apparatus including the electrophoretic display device, and a method of manufacturing the electrophoretic display device.

2. Related Art

As an electrophoretic display device, there is known a microcapsule-type electrophoretic display panel in which a microcapsule display layer is interposed between a pair of substrates (JP-A-2005-114822).

Figure 15:
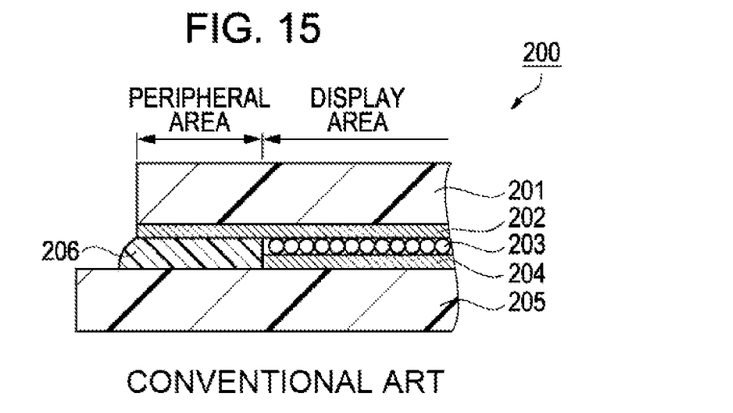
FIG. 15 is a schematic sectional view illustrating the configuration of a known microcapsule-type electrophoretic display panel.

FIG. 15 is a schematic sectional view illustrating a microcapsule-type electrophoretic display panel. As shown in FIG. 15, a microcapsule type electrophoretic display panel 200 includes a microcapsule display layer 203 which is interposed between a transparent resin film 201 and a substrate 205, which serve as the pair of substrates.

In the microcapsule-type electrophoretic display panel 200, the microcapsule display layer 203 is formed by printing electronic ink containing microcapsules on a transparent electrode layer 202, which is formed on the transparent resin film 201 and serves as a common electrode, by screen printing.

Subsequently, after a first adhesive layer 204 is formed on the microcapsule display layer 203, the microcapsule display layer 203 of an area corresponding to the peripheral area of the panel and the first adhesive layer 204 are removed.

Subsequently, the substrate 205 is attached with the first adhesive layer 204 interposed between the substrate and the microcapsule display layer. On the substrate 205, pixel electrodes, thin film transistors corresponding to the pixel electrodes, signal electrodes, scanning electrodes are arranged (not shown).

A first moisture blocking resin layer 206 is formed in the peripheral area of the microcapsule display layer 203 by inserting a resin into a gap between the transparent resin film 201 and the substrate 205. Accordingly, the characteristics of the microcapsule display layer 203 may effectively be prevented from deteriorating due to invasion of moisture.

Examples of the material of the transparent resin film 201 serving as one substrate include polyethylene terephthalate, polymethylmethacrylate, polycarbonate. The substrate 205 serving as the other substrate is formed of a glass substrate or a resin film.

Examples of the first moisture blocking resin layer 206 include thermal or ultraviolet curable acrylic resin, metacrylate resin, and epoxy resin.

In the microcapsule-type electrophoretic display panel 200, when one pair of substrates is formed of glass, for example, the linear expansion coefficient of the pair of substrates is smaller than the linear expansion coefficient of the first moisture blocking resin layer 206. For example, when a thermal shock test or a thermal cycle test is carried out at a temperature from $-20°$ C. to $85°$ C. as a reliability test, a local stress occurs between the first moisture blocking resin layer 206 and one pair of substrates depending on the different linear expansion coefficients. Processing strains such as micro cracks in a cutting process may occur in the outer edges of the glass substrates. For this reason, when a crack occurs due to the processing strain of the local stress, the glass substrates may be broken.

When the glass substrates are broken, electric damage may occur in the electrodes formed on the glass substrates. Then, problems may arise in that reliability may deteriorate since display defects occur and moisture invades.

SUMMARY

An advantage of some aspects of the invention is that it provides an electrophoretic display device, an electronic apparatus including the electrophoretic display device, and a method of manufacturing the electrophoretic display device.

Application 1

According to an aspect of the invention, there is provided an electrophoretic display device including: first and second substrates; an electrophoretic layer which is interposed between the first and second substrates; and a third substrate which is disposed opposite the first substrate with the second substrate interposed therebetween, which is joined to the first substrate with a sealing member interposed therebetween, and which seals the electrophoretic layer with the second substrate interposed therebetween. The first and third substrates have extension sections extending with respect to the second substrate in a plan view. The sealing member has a gap in an outer edge of the third substrate and fills the extension sections.

With such a configuration, even when local stress occurs between the third substrate and the sealing member due to the different linear expansion coefficients upon carrying out a thermal shock test or a thermal cycle test at a temperature from $-20°$ C. to $85°$ C., for example, the third substrate can be prevented from being broken due to the processing strain in the outer edges. This is because the gap is formed in the outer edges of the sealing member and the third substrate. Accordingly, it is possible to realize an electrophoretic display device excellent in reliability.

Application 2

In the electrophoretic display device according to the above application, a member having an elastic modulus smaller than that of the sealing member may be disposed in the gap.

With such a configuration, upon carrying out a thermal shock test or a thermal cycle test at a temperature from $-20°$ C. to $85°$ C., for example, the local stress occurring between the first and third substrates due to the different linear expansion coefficients can be reduced. Accordingly, it is possible to inhibit the breakdown caused due to the processing strain occurring in the outer edge of at least third substrate.

Application 3

In the electrophoretic display device according to the above application, edge portions of the first and third substrates facing the gap may be chamfered.

With such a configuration, by chamfering the edge portions, the processing strain occurring in the outer edges of the first or third substrate is removed. Therefore, even when the local stress occurs between the first and third substrates due to the different linear expansion coefficients upon carrying out a thermal shock test or a thermal cycle test at a temperature from $-20°$ C. to $85°$ C., for example, it is possible to prevent the first and third substrates from being broken. This is because the processing strain occurring in the outer edges of the first and third substrates is removed.

The chamfering is a process of forming plural edge portions with an angle larger than that of the initial edge portions by cutting or chemically etching the edge portions. Alternatively, R chamfering may be executed to form the ends of the substrate by cutting or chemically etching the edge portions to round the edge portions and form the curved surfaces.

Application 4

In the electrophoretic display device according to the above application, a connection terminal connecting an external circuit may be disposed on at least one side of the extension sections of the first substrate. The extension section in which the connection terminal may be disposed is longer than the other extension sections.

With such a configuration, upon carrying out a thermal shock test or a thermal cycle test at a temperature from −20° C. to 85° C., for example, it is possible to inhibit the breakdown of the first substrate caused due to the processing strain occurring in the outer edges thereof. Accordingly, it is possible to improve the reliability of connection to an external circuit.

Application 5

According to another aspect of the invention, there is provided an electronic apparatus comprising the electrophoretic display device according to the above application.

With such a configuration, upon carrying out a thermal shock test or a thermal cycle test at a temperature from −20° C. to 85° C., for example, at least the third substrate can be inhibited from being broken down due to the local stress occurring between the third substrate and the sealing member due to the different linear expansion coefficients of the sealing member. Accordingly, it is possible to provide the electronic apparatus including the electrophoretic display device with an excellent reliability.

Application 6

According to still another aspect of the invention, there is provided a method of manufacturing an electrophoretic display device. The method includes: disposing respective electrophoretic layers of plural panel areas each corresponding to one electrophoretic display device on a first mother substrate; disposing dam members between the adjacent electrophoretic layers on the first mother substrate in a state where gaps are formed between the dam members and the electrophoretic layers; attaching a second mother substrate to the first mother substrate close to the electrophoretic layers; forming sealing members by filling a sealing material into areas surrounded by the first mother substrate, the second mother substrate, the dam members, and the electrophoretic layers and hardening the sealing material; and cutting the first and second mother substrates along the areas where the dam members are disposed. An elastic modulus of the dam member is smaller than an elastic modulus of the sealing member.

With such a method, it is possible to obtain the electrophoretic display device including the electrophoretic layer between the substrate cut from the first mother substrate and the substrate cut from the second mother substrate, wherein the dam members are disposed in the outer edges of the substrates between one pair of substrates and the sealing member is disposed in the area except for the outer edges of the substrates. In the electrophoretic display device, even when the strain occurs due to the different linear expansion coefficients of the substrate and the sealing member, the local stress scarcely occurs in the outer edges of the substrate. This is because the elastic modulus of the dam members disposed in the outer edges of the substrate is smaller than the elastic modulus of the sealing member disposed inwards. Accordingly, it is possible to prevent the electrophoretic display device from being broken from the outer edges of the substrate.

Application 7

According to still another aspect of the invention, there is provided a method of manufacturing an electrophoretic display device. The method includes: disposing respective electrophoretic layers of plural panel areas each corresponding to one electrophoretic display device on a first mother substrate; disposing dam members between the adjacent electrophoretic layers on the first mother substrate in a state where gaps are formed between the dam members and the electrophoretic layers; attaching a second mother substrate to the first mother substrate close to the electrophoretic layers; forming sealing members by filling a sealing material into areas surrounded by the first mother substrate, the second mother substrate, the dam members, and the electrophoretic layers and hardening the sealing material; cutting the first and second mother substrates along the areas where the dam members are disposed; and removing the dam members after cutting the first and second mother substrates.

With such a method, it is possible to obtain the electrophoretic display device including the electrophoretic layer between the substrate cut from the first mother substrate and the substrate cut from the second mother substrate, and the sealing member disposed in the area except for the outer edges of the substrates between one pair of substrates. In the electrophoretic display device, even when the strain occurs due to the different linear expansion coefficients of the substrate and the sealing member, the local stress scarcely occurs in the outer edges of the substrate. This is because the sealing member is not disposed in the outer edges of the substrate. Accordingly, it is possible to prevent the electrophoretic display device from being broken from the outer edges of the substrate.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an electrophoretic display device according to embodiments of the invention will be described with reference to the drawings. The following embodiments are preferred examples of the invention and a variety of limitations on a technical scope are made. However, the scope of the invention is not limited to the embodiment set forth herein as long as the description limiting the invention is not made. In order to enable easy description of elements in the accompanying drawings, the layers or the elements are appropriately shown with different scales for easy recognition.

First Embodiment

Figure 1:
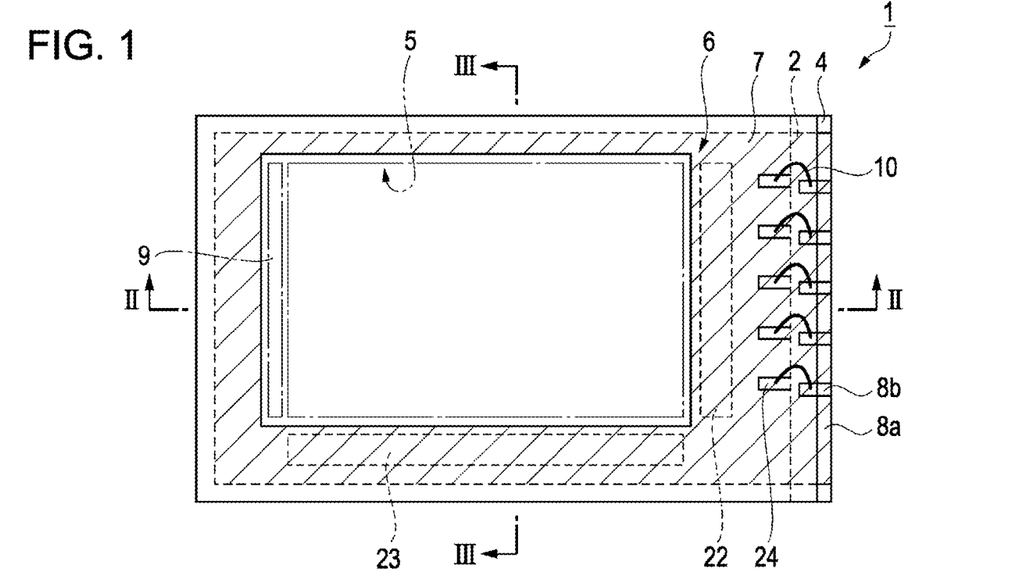
FIG. 1 is a schematic plan view illustrating the configuration of an electrophoretic display device according to a first embodiment.
Figure 2:
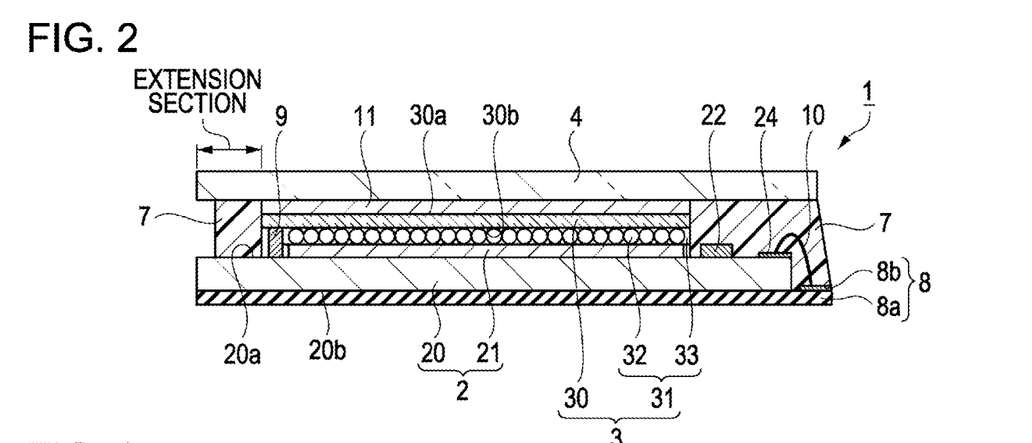
FIG. 2 is a schematic sectional view taken along the line II-II of FIG. 1.
Figure 3:
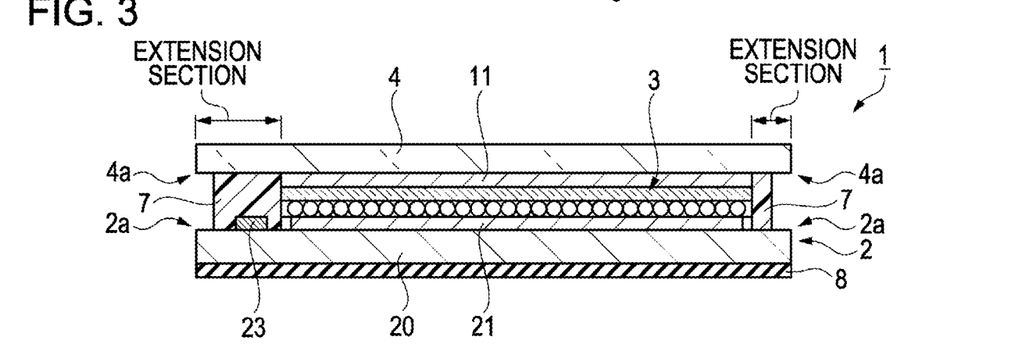
FIG. 3 is a schematic sectional view taken along the line III-III of FIG. 1.

FIG. 1 is a schematic plan view illustrating the configuration of an electrophoretic display device according to a first embodiment. FIG. 2 is a schematic sectional view taken along the line II-II of FIG. 1. FIG. 3 is a schematic sectional view taken along the line III-III of FIG. 1.

As shown in FIGS. 1 to 3, an electrophoretic display device 1 according to this embodiment includes an element substrate 2 serving as a first substrate, an electrophoretic sheet 3, and a protective substrate 4 serving as a third substrate. The element substrate 2 and the electrophoretic sheet 3 are attached and joined, and the protective substrate 4 is disposed on the electrophoretic sheet 3. In the electrophoretic display device 1, a display area 5 displaying an image such as a still image or a moving image is disposed. In the display area 5, a plurality of pixels is arranged in a matrix shape and all of the pixels execute a display operation. A non-display area 6 displaying no image is formed in the periphery of the display area 5. In the non-display area 6, no pixel is disposed and driving circuit elements 22 and 23, terminals 24, and the like are disposed.

The element substrate 2 includes a rectangular substrate 20 in which electrodes, elements, wires, and the like driving the electrophoretic display device 1 are disposed. Examples of the substrate 20 include a glass substrate, a quartz substrate, a silicon substrate, a gallium arsenide substrate, and a plastic substrate (resin substrate) formed of polyimide, polyethylene terephthalate (PET), polyethylene naphthalate (PEN), polymethylmethacrylate (PMMA), polycarbonate (PC), polyether sulfone (PES), aromatic polyester (liquid crystal polymer), or the like.

As shown in FIG. 2, a driving layer 21 is formed in an area corresponding to the display area 5 in the substrate 20. Pixel electrodes and switching elements, which are respectively formed in the pixels, and data lines and scanning lines, which are respectively connected to the switching elements, are formed in the driving layer 21.

The driving circuit elements 22 and 23 are disposed in areas outside the driving layer 21. The driving circuit elements 22 and 23 are electrically connected to the data lines and the scanning lines to supply signals to the driving layer 21.

A plurality of terminals 24 is disposed in the end (the right end in the drawing) of the element substrate 2 and is connected to the driving circuit elements 22 and 23 via wires (not shown) formed on the element substrate 2.

A connection substrate 8 is attached to the rear surface 20b of the substrate 20. The connection substrate 8 includes a core member 8a formed of an insulating member made of glass epoxy, for example, and connection electrodes 8b disposed on the core member 8a. Therefore, the connection substrate 8 has a green color.

As shown in FIGS. 1 and 2, the core member 8a is a rectangular plate-shaped member of which one side is formed over the outer frame of the substrate 20 and which covers the entire surface of the rear surface 20b of the substrate 20. The plurality of connection electrodes 8b is formed of metal such as copper and is disposed along one side of the core member 8a. The connection electrodes 8b are connected to the terminals 24 disposed on the front surface 20a of the substrate 20, respectively, through wires 10 made of metal such as copper.

The electrophoretic sheet 3 includes a transparent substrate 30 serving as a second substrate and an electrophoretic layer 31. The transparent substrate 30 is a substrate maintaining the electrophoretic layer 31 and a rectangular substrate made of a material having a high optical transparency, such as polyethylene terephthalate (PET), polyether sulfone (PES), or polycarbonate (PC). A front surface 30a of the transparent substrate 30 serves as a display surface of the electrophoretic display device 1. A common electrode (not shown) is formed nearly on the entire inner surface 30b of the transparent substrate 30. The common electrode is formed of a conductive material having a high optical transparency, such as ITO, and is electrically connected to the element substrate 2 via a vertical conductive member 9.

The electrophoretic layer 31 includes a plurality of microcapsules (electrophoretic material layer) 32 and an adhesive layer 33.

The microcapsule 32 is a substantially spherical capsule enclosing an electrophoretic dispersion liquid. The microcapsules 32 have almost the same diameter (50 μm to 100 μm). Examples of a material forming the capsule wall membrane of the microcapsules 32 include a compound membrane of gum Arabic and gelatin, a urethane resin, a urea resin, and a compound of urea resin or the like. An electrophoretic dispersion liquid enclosed in the microcapsule 32 is an electrooptic material of which optical characteristics varies in response to electric stimulus and is formed by electrophoretic particles and a liquid-phase dispersion medium in which the electrophoretic particles disperse.

Examples of the liquid-phase dispersion medium include water, alcoholic solvent, esters, ketones, aliphatic hydrocarbons, alicyclic hydrocarbon, aromatic hydrocarbons, halogenated hydrocarbon, carboxylate salt, and other oil substances. These materials may be used singly or as a mixture and may be mixed with surfactant and the like.

As the electrophoretic particles, organic or inorganic particles (polymer or colloid) which move by electrophoresis caused by a potential difference in the liquid-phase dispersion medium may be used. Specifically, at least one kind of material may be used among black pigments such as carbon black and aniline black, white pigments such as titanium dioxide, azo-based pigments of monoazo, yellow pigments such as isoindolinone, azo-based pigments of monoazo, red pigments such as quinacridone red, blue pigments such as phthalocyanine blue, green pigments such as phthalocyanine green. A charging control agent including particles of electrolyte, surfactant, metal soap, resin, rubber, oil, varnish, or compound, a dispersion solvent such as titanium coupling agent, aluminum coupling agent, and silane coupling agent, lubricant, and stabilizer may be added to the pigments as needed.

In the microcapsule 32, two kinds of electrophoretic particles, that is, titanium dioxide used as the white pigment and carbon black used as the black pigment are enclosed. One of the titanium dioxide and the carbon black is charged to positive and the other thereof is charged to negative. Of course, the display operation may be executed by using other electrophoretic particles or using only one kind of electrophoretic particles to electrophorese the electrophoretic particles to the common electrode or the pixel electrodes.

The adhesive layer 33 is a thermal adhesive member also serving a binder. It is desirable that the adhesive layer 33 is excellent in a property adhesive to the common electrode and the pixel electrodes owing to good affinity to the capsule membrane of the microcapsule 32 and has excellent insulating properties.

The protective substrate 4 is preferably formed of glass in which optical transparency is high, flatness is excellent, and scratching scarcely occurs. Specifically, inorganic glass or crystal glass may be used. Alternatively, sapphire glass or acryl glass may be used. The protective substrate 4 and the electrophoretic sheet 3 are fixed by a transparent adhesive layer 11 such as a double-stick tape.

As shown in FIGS. 2 and 3, a sealing member 7 is disposed in an extension section of the element substrate 2 and the protective substrate 4 extending from the periphery of the electrophoretic sheet 3. Examples of the material of the sealing member 7 include epoxy-based resin, acryl-based resin, and silicon-based resin. In this embodiment, the sealing member 7 is formed of epoxy-based resin.

The sealing member 7 is disposed so as to cover the terminals 24 of the element substrate 2, the connection electrodes 8b of the connection substrate 8, and all the wires 10 connecting the terminals 24 to the connection electrodes 8b, so that the area where the element substrate 2 is connected to the connection substrate 8 is covered with the sealing member 7.

The electrophoretic layer 31 is interposed between the element substrate 2 and the transparent substrate 30 and is covered with the protective substrate 4, so that the peripheral region of the electrophoretic layer 31 is sealed by the sealing member 7. Since the hydrophobic electrophoretic layer 31 is covered in this way, it is possible to reliably prevent water from invading. In this embodiment, the sealing member 7 is not disposed in all of the areas corresponding to the extension section of the element substrate 2 and the protective substrate 4, and a gap is formed in at least the outer edge of the protective substrate 4. In other words, the sealing member 7 does not come into contact with ends 4a and 2a in the outer edges of the protective substrate 4 and the element substrate 2.

Next, a method of manufacturing the electrophoretic display device 1 will be described with reference to FIGS. 4 to 11. FIGS. 4 to 11 are schematic diagrams illustrating the method of manufacturing the electrophoretic display device.

In this embodiment, a method, which is called a multi chamfering method, of forming a collective (a collective of a mother substrate) of plural electrophoretic display panels, disposing the collective (the collective of the mother substrate) on a dicing tape, and cutting the collective (the collective of the mother substrate) by a dicing blade or the like to make the individual electrophoretic display devices 1 will be described.

Figure 4:
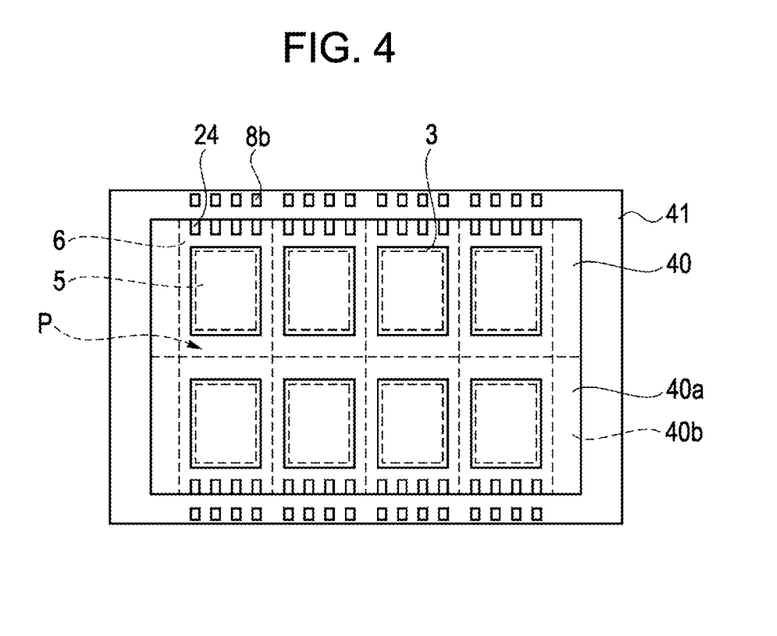
FIG. 4 is a schematic plan view illustrating a method of manufacturing the electrophoretic display device according to the first embodiment.

As shown in FIG. 4, plural panel areas P are first formed on a front surface 40a of a mother substrate 40 serving as a first mother substrate. Pixel electrodes, switching elements, and the like are formed in the display area 5 of each panel area P. The driving circuit elements 22 and 23, the terminals 24, the wires, and the like described above are formed in the non-display area 6. Each of the panel areas P is formed as each of the electrophoretic display devices 1. After the panel areas P are formed, a mother connection substrate 41 is attached to a rear surface 40b of the mother element substrate 40 with an adhesive tape or the like interposed therebetween. After the mother connection substrate 41 is attached, the electrophoretic sheet 3 including the electrophoretic layer 31 is attached to a predetermined position corresponding to the display area 5 of each panel area P.

Figure 5:
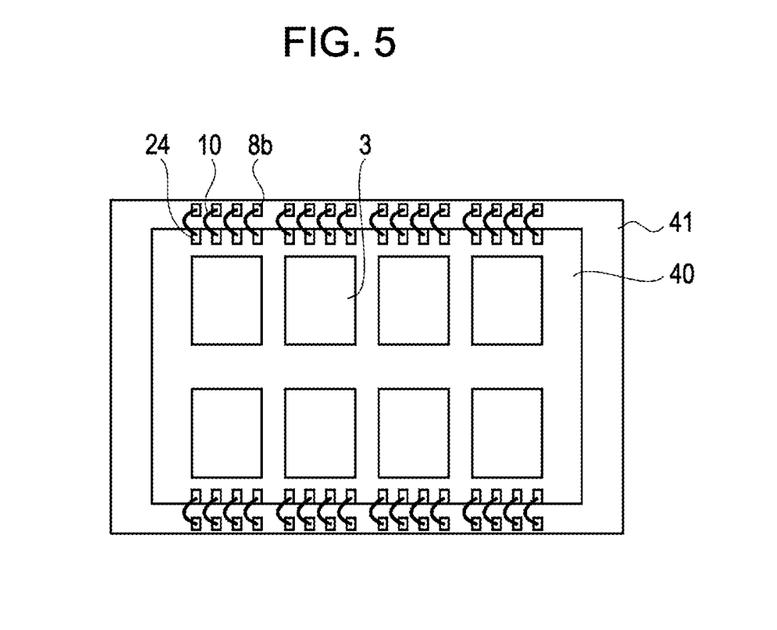
FIG. 5 is a schematic plan view illustrating the method of manufacturing the electrophoretic display device according to the first embodiment.
Figure 6:
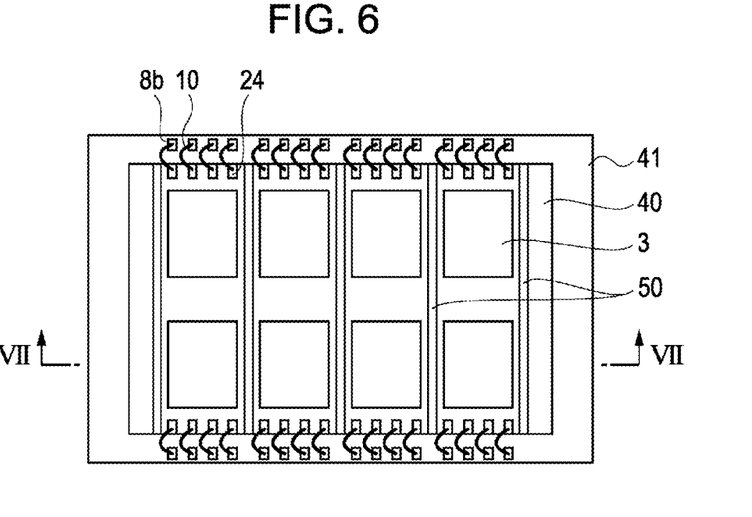
FIG. 6 is a schematic plan view illustrating the method of manufacturing the electrophoretic display device according to the first embodiment.
Figure 7:
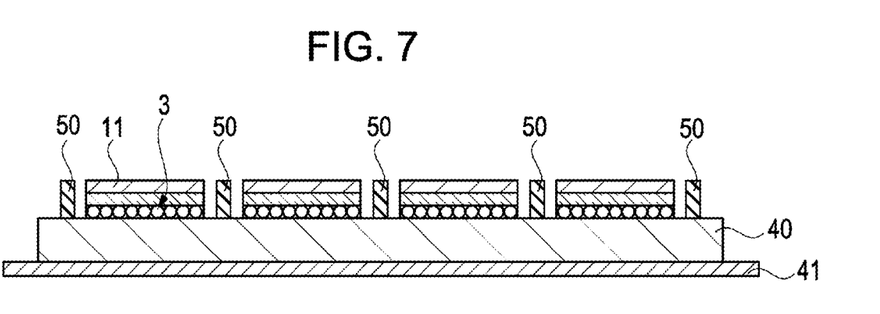
FIG. 7 is a schematic sectional view illustrating the method of manufacturing the electrophoretic display device according to the first embodiment.

After the electrophoretic sheet 3 is attached, as shown in FIG. 5, the terminals 24 on the mother element substrate 40 and the connection electrodes 8b on the mother connection substrate 41 are connected by the wires 10. After the connection is made by the wires 10, as shown in FIGS. 6 and 7, dam members 50 are disposed by allowing necessary sealing areas to remain in the areas where the electrophoretic sheets 3 are attached on the mother element substrate 40 and areas other than the areas where the connection is made by the wires. The dam members 50 are formed of a material such as silicon rubber. The dam members have a thickness equal to or slightly larger than the gap between the mother element substrate 40 and a mother protective substrate 44, which are joined later, and hinder the sealing member 7 from flowing into the areas which become the end of the periphery of each electrophoretic display device 1.

Figure 8:
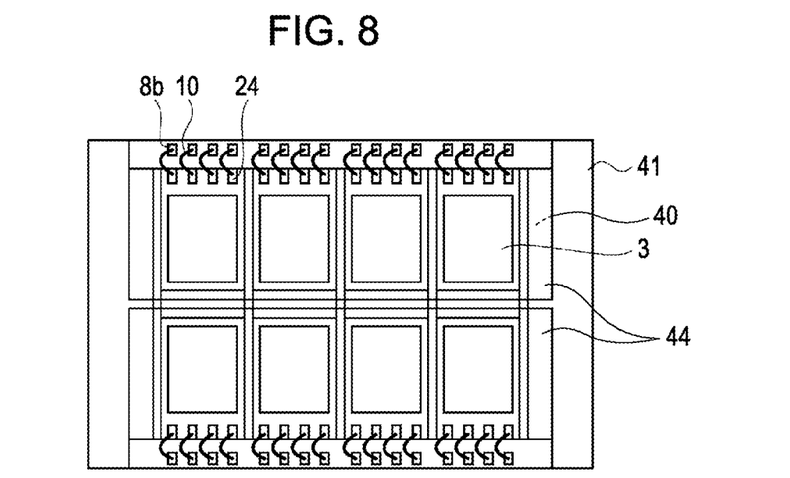
FIG. 8 is a schematic plan view illustrating the method of manufacturing the electrophoretic display device according to the first embodiment.
Figure 9:
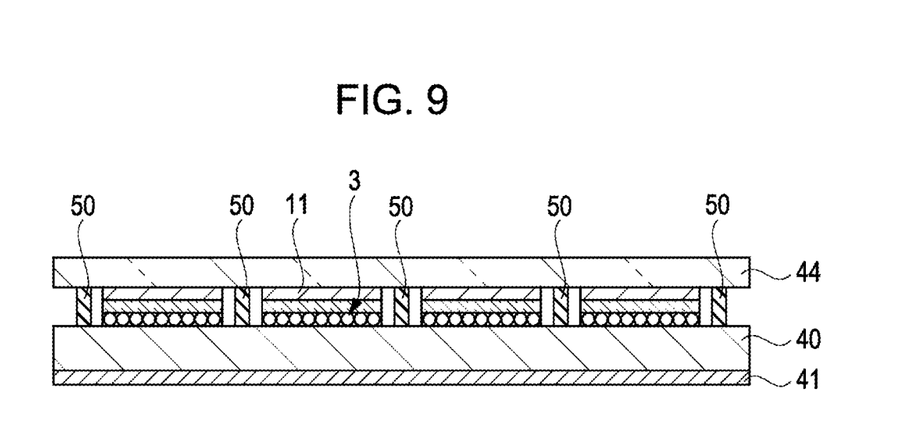
FIG. 9 is a schematic sectional view illustrating the method of manufacturing the electrophoretic display device according to the first embodiment.

After the dam members 50 are disposed, as shown in FIGS. 8 and 9, the mother protective substrate 44 serving as a second mother substrate is attached to the upper side of the electrophoretic sheet 3. For example, one sheet of mother protective substrate 44 is disposed so as to cover the panel areas P on the upper part of FIG. 8 among the plural panel areas P, and one sheet of mother protective substrate 44 is disposed so as to cover the panel areas P on the lower part of FIG. 8. These mother protective substrates 44 are attached to the electrophoretic sheets 3 with the adhesive layers 11 interposed therebetween.

Figure 10:
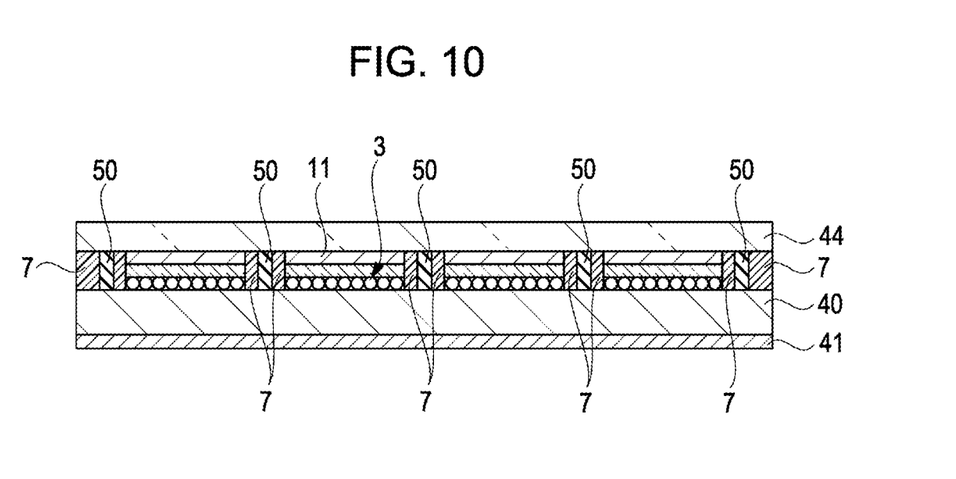
FIG. 10 is a schematic sectional view illustrating the method of manufacturing the electrophoretic display device according to the first embodiment.

The configuration in which the mother protective substrates 44 are attached is shown in FIG. 9. As shown in FIG. 9, the electrophoretic sheets 3 and the mother protective substrate 44 are attached with the adhesive layers 11 interposed therebetween. In this state, the sealing members 7 flow into the spaces between the dam members 50 and the electrophoretic sheets 3 to form the sealing areas. More specifically, the sealing material flows into and fills the areas surrounded by the mother element substrate 40, the mother protective substrate 44, the dam members 50, and the electrophoretic sheets 3, and then is hardened to form the sealing members 7 in the sealing areas, as shown in FIG. 10.

Figure 11:
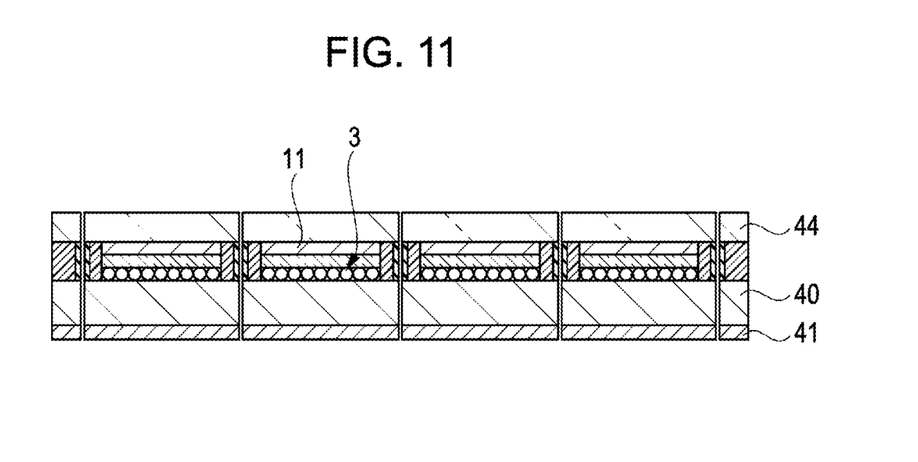
FIG. 11 is a schematic sectional view illustrating the method of manufacturing the electrophoretic display device according to the first embodiment.

After the sealing members 7 are hardened, as shown in FIG. 11, the mother connection substrate 41 is disposed on the dicing tape (not shown) so as to face the lower side. The collective (the mother connection substrate 41, the mother element substrate 40, and the mother protective substrates 44) of the mother substrate is cut along the areas, where the dam members 50 are disposed, by the dicing blade (not shown).

After the collective is cut, the dam members 50 disposed between the mother element substrate 40 and the mother protective substrates 44 are removed to obtain the individual electrophoretic display devices 1. Processing strains such as micro cracks in the dicing cutting process occur in the ends 2a and 4a (see FIG. 3) of the outer edges of the element substrate 2 and the protective substrate 4 of each electrophoretic display device 1.

According to this embodiment, the display areas 5 on the mother element substrate 40 and the connection electrodes 8b on the mother connection substrate 41 corresponding to the display areas 5 are connected by the wires 10, the dam members 50 are disposed around the electrophoretic sheets 3 except for the areas connected to the wires and the sealing areas, and then the mother protective substrates 44 are attached on the upper surface of the electrophoretic sheets 3 and the upper surface of the dam members 50. Accordingly, sealing can be achieved without connection of the sealing members 7 to the areas where the mother protective substrates 44 and the mother element substrate 40 are cut.

In this way, it is possible to obtain the electrophoretic display devices 1 having the configuration in which the gap is formed in the outer edges of the protective substrate 4 in the extension sections. The sealing member 7 does not come into contact with the element substrate 2 or the ends 2a and 4a of the protective substrate 4 where the Processing strains occurs by the cutting. Accordingly, even when a local stress occurs between the element substrate 2 or the protective substrate 4 and the sealing member 7 due to the different linear expansion coefficients of the substrate material and the sealing member 7 upon carrying out a thermal shock test or a thermal cycle test at a temperature from −20° C. to 85° C., for example, the protective substrate 4 or the element substrate 2 can be prevented from being broken due to processing strains such as micro cracks. The driving circuit elements 22 and 23 disposed on the element substrate 2 or the wires connected to the driving circuit elements can be prevented from being fractioned. Moreover, moisture or the like can be prevented from invading into the electrophoretic sheet 3 due to the Processing strains of the ends of the substrate.

Since the transparent substrate 30, the microcapsules 32, or the like are disposed between the protective substrate 4 and the element substrate 2 in the electrophoretic display device 1, a space between the protective substrate 4 and the element substrate 2, that is, the thickness of the sealing member 7 is several tens of μm, or 100 μm or more in some cases. Therefore, in the sealing member 7 of the electrophoretic display device 1, an absolute strain degree caused by thermal contraction is increased by 1 or 2 digits, compared to a sealing member (a sealing member attaching and joining two sheets of substrates of a liquid crystal device) having a thickness of about several μm in a liquid crystal device, for example. For this reason, a problem may easily arise in that the substrate is broken due to thermal contraction of the sealing member 7 in the electrophoretic display device 1. On the contrary, in the liquid crystal device, this problem scarcely occurs. Since the sealing member 7 according to this embodiment is configured so as to solve the specific problem of the electrophoretic display device 1, all the configurations, operations, advantages are different from those of the sealing member of the liquid crystal device or the like.

In this embodiment, the case where the electrophoretic display device 1 is manufactured by the method called the multi chamfering method has been described, but the invention is not limited thereto. The invention is applicable to a case where the electrophoretic display device 1 is individually manufactured.

When the electrophoretic display device 1 is individually manufactured, the electrophoretic display device 1 can be manufactured such that the electrophoretic sheet 3 is attached to the display area 5 on the front surface of the element substrate 2, the connection substrate 8 including the connection electrodes 8b is adhered and joined to the rear surface of the element substrate 2, the display area 5 and the connection electrodes 8b are connected to each other by the wires 10 to make the connection by the wires 10, the dam members 50 are disposed around the electrophoretic sheet 3, the protective substrate 4 is attached to the surface of the electrophoretic sheet 3 and the surfaces of the dam members 50 with the adhesive layer 11 interposed therebetween.

In the above-described embodiment, the epoxy resin is used as the material of the sealing member 7, but the invention is not limited thereto. Another material containing the material mentioned in the embodiment may, of course, be used.

In the above-described embodiment, the silicon rubber is used as the material of the dam members 50, but the invention is not limited thereto. Another material containing the material mentioned in the embodiment may, of course, be used.

Second Embodiment

Figure 12:
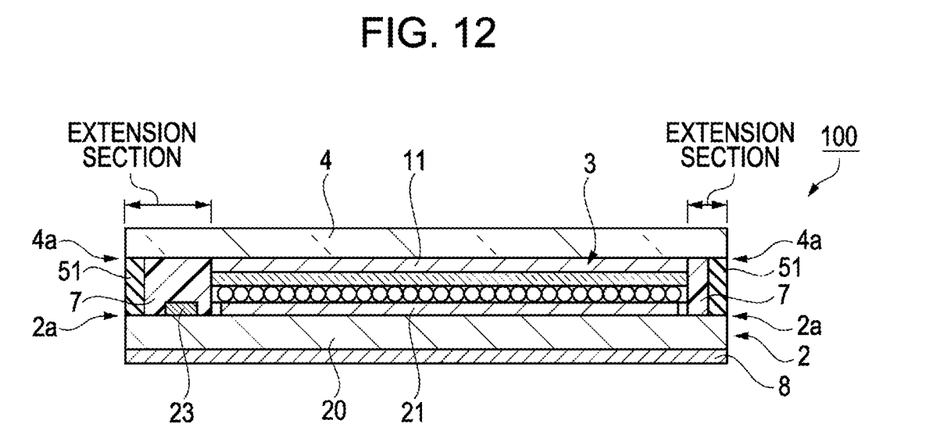
FIG. 12 is a schematic sectional view illustrating the configuration of an electrophoretic display device according to a second embodiment.

FIG. 12 is a schematic sectional view illustrating the configuration of an electrophoretic display device according to a second embodiment. The same reference numerals are given to the same elements as those of the electrophoretic display device 1 according to the above-described first embodiment, and the detailed description is omitted.

As shown in FIG. 12, an electrophoretic display 100 according to this embodiment includes a connection substrate 8, an element substrate 2, connection wires, an electrophoretic sheet 3, a protective substrate 4, and a sealing member 7. The shape of the extension section is different from that of the electrophoretic display device 1 according to the first embodiment. Hereinafter, the difference will be described in detail.

An adhesive dam member 51 is further filled in the gap of the extension section of the element substrate 2 and the protective substrate 4 described in the first embodiment. The adhesive dam member 51 is filled and buried in at least the gaps of the ends of the protective substrate 4.

The adhesive dam member 51 is capable of preventing the sealing member 7 from coming into contact with the ends 2a and 4a of the element substrate 2 or the protective substrate 4, like the dam member 50 of the first embodiment. Since the material of the adhesive dam member is an acryl-based adhesive material, the elastic modulus thereof is smaller than the elastic modulus of the sealing member 7 (for example, epoxy-based resin).

According to this embodiment, since the gap of the extension section is buried by the adhesive dam member 51, stress occurring since the linear expansion coefficient of the substrate material is different from that of the material of the sealing member 7 can be made small. Accordingly, it is possible to reliably inhibit the element substrate 2 or the protective substrate 4 from being broken due to the Processing strains such as micro cracks in the cutting process. For example, when the adhesive member 51 is used instead of the dam member 50 disposed in the multi chamfering process, no chasm occurs owing to the adhesive material. Moreover, the process becomes simpler since it is not necessary to remove the adhesive member.

In the above-described embodiment, the acryl-based adhesive material is used as the material of the adhesive dam member 51, but the invention is not limited thereto. Another material containing the material mentioned in the embodiment may, of course, be used.

Third Embodiment

Figure 13:
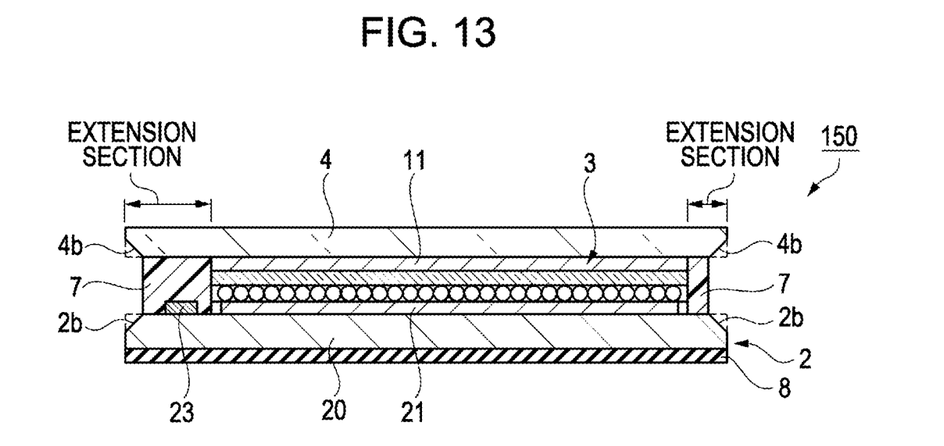
FIG. 13 is a schematic sectional view illustrating the configuration of an electrophoretic display device according to a third embodiment.

FIG. 13 is a schematic sectional view illustrating the configuration of an electrophoretic display device according to a third embodiment. The same reference numerals are given to the same elements as those of the electrophoretic display device 1 according to the above-described first embodiment, and the detailed description is omitted.

An electrophoretic display device 150 according to this embodiment includes a connection substrate 8, an element substrate 2, connection wires, an electrophoretic sheet 3, a protective substrate 4, and a sealing member 7. The shape of the extension section is different from that of the electrophoretic display device 1 according to the first embodiment. Hereinafter, the difference will be described in detail.

In this embodiment, like the first embodiment, a collective (a mother connection substrate 41, a mother element substrate 40, a mother protective substrate 44) of mother substrates is cut along the areas, where the dam members 50 are formed, by the dicing blade (not shown) to form the respective electrophoretic display devices 1. The corners (edge portions) of the cut surfaces of the element substrate 2 or the protective substrate 4 are chamfered. By chamfering the corners (edge portions), it is possible to obtain the electrophoretic display device 150 having inclined surfaces 2b and 4b of the ends of the outer edges of the element substrate 2 and the protective substrate 4. In this way, strains or micro cracks occurring in the corners (edge portions) or the sharply formed corners are removed by chamfering the corners. Since the driving circuit elements 22 and 23 formed on the element substrate 2, the electric wires, and the electrophoretic sheet 3 are protected by the sealing member 7, the glass waste occurring in the chamfering process is not attached to the wires or the like.

It is more desirable that the outer edge of the electrophoretic display device 150 subjected to the chamfering process is etched. Therefore, the corners (edge portions) of the outer edges of the element substrate 2 and the protective substrate 4 are rounded. By performing the etching to remove the minute strain or crack occurring near the corners (edge portions), it is possible to make the corners (edge portions) rounder. In this way, by removing the strain and crack in the ends of the substrates, the source causing the breakdown by stress is removed. Therefore, it is possible to prevent the protective substrate 4, the element substrate 2 from being broken and prevent the driving circuit elements 22 and 23, the wires, or the like from being damaged.

It is desirable to execute wet etching by immersing the electrophoretic display device 150 in an etching liquid. However, drying etching may be used by an etching gas. As shown in FIG. 2, it is difficult that a portion protruding from the element substrate 2 to the connection substrate 8 is subjected to this process. Therefore, the chamfering or etching of the edge portions of the element substrate 2 may not be executed.

Fourth Embodiment

Figure 14A:
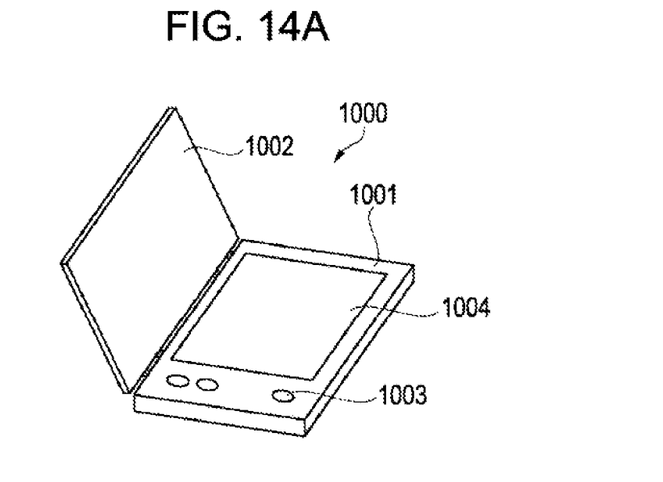
FIG. 14A is a perspective view illustrating an electronic book, which is an example of an electronic apparatus, according to a fourth embodiment.
Figure 14B:
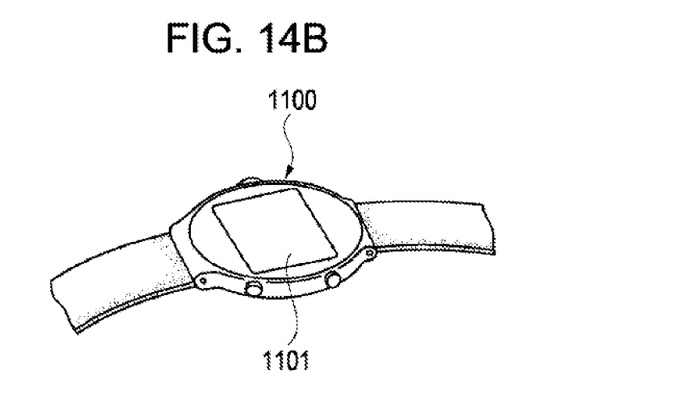
FIG. 14B is a perspective view illustrating a wrist watch, which is an example of an electronic apparatus, according to the fourth embodiment.

Next, an electronic apparatus including the electrophoretic display device according to the above-described embodiments will be described as an example. FIGS. 14A and 14B are perspective views illustrating specific examples of the electronic apparatus including the electrophoretic display device.

FIG. 14A is the perspective view illustrating an electronic book as an example of the electronic apparatus. An electronic book 1000 includes a book-shaped main body 1001, a cover 1002 rotatably installed (openable) in the main body 1001, an operational unit 1003, and a display unit 1004 formed of the electrophoretic display device according to the above-described embodiments. One of the electrophoretic display devices 1, 100, and 150 according to the above-described embodiments is mounted in the display unit 1004.

FIG. 14B is the perspective view illustrating a wrist watch as an example of the electronic apparatus. A wrist watch 1100 includes a display unit 1101 formed of the electrophoretic display device according to the above-described embodiments.

One of the electrophoretic display devices 1, 100, and 150 according to the above-described embodiments is mounted in the display units 1004 and 1101.

The electronic apparatus to which the electrophoretic display devices according to the above-described embodiments are applicable are not limited thereto, but includes an apparatus using a visual variation in colors made by the movement of electrophoretic particles (charged particles).

The invention is not limited to the above-described embodiments, but may be modified in various forms within the scope of the gist of the invention. For example, in the third embodiment, the method of rounding the corners (edge portions) of the outer edges of the element substrate 2 and the protective substrate 4 is not limited to a chemical process such as etching. For example, when the electrophoretic display devices 150 is manufactured individually, the ends of the rectangular element substrate 2 or the rectangular protective substrate 4 may be ground and subjected to R chamfering mechanically in advance. The four sides of each substrate may be chamfered. That is, the reliability against the breakdown of the substrate may be further achieved.

The entire disclosure of Japanese Patent Application Nos: 2009-3252, filed Jan. 9, 2009 and 2009-185490, filed Aug. 10, 2009 are expressly incorporated by reference herein.

What is claimed is:

1. An electrophoretic display device comprising:
   a first substrate;
   a second substrate;
   an electrophoretic layer which is interposed between the first substrate and the second substrate; and
   a third substrate which is disposed opposite the first substrate with the second substrate interposed between the first substrate and the third substrate, the third substrate being joined to the first substrate with a sealing member interposed between the first substrate and the third substrate, and the sealing member sealing the electrophoretic layer with the second substrate interposed between the first substrate and the third substrate,
   wherein the first substrate and the third substrate have extension sections extending with respect to the second substrate in a plan view,
   wherein the sealing member fills a part of a gap between the extension section of the first substrate and the extension section of the third substrate,
   wherein the sealing member does not come into contact with an outer edge of the third substrate, and
   wherein a dam member having an elastic modulus smaller than that of the sealing member is disposed in the gap.

2. The electrophoretic display device according to claim 1, wherein edge portions of the first substrate and the third substrate facing the gap are chamfered.

3. The electrophoretic display device according to claim 1,
   wherein a connection terminal connecting an external circuit is disposed on at least one side of the extension sections of the first substrate, and
   wherein the extension section in which the connection terminal is disposed is longer than the other extension sections.

4. An electronic apparatus comprising the electrophoretic display device according to claim 1.

5. A method of manufacturing an electrophoretic display device, comprising:

disposing a plurality of panel areas each corresponding to one electrophoretic display device on a first mother substrate;

disposing a plurality of electrophoretic sheets on the plurality of panel areas, each electrophoretic sheet corresponding to a panel area included in the plurality of panel areas;

disposing dam members between adjacent electrophoretic sheets on the first mother substrate in a state where gaps are formed between the dam members and the electrophoretic sheets;

attaching a second mother substrate to the first mother substrate close to the electrophoretic sheets;

forming sealing members by filling a sealing material into areas surrounded by the first mother substrate, the second mother substrate, the dam members, and the electrophoretic sheets and hardening the sealing material; and cutting the first and second mother substrates along the areas where the dam members are disposed.

6. The method of claim 5, wherein an elastic modulus of the dam member is smaller than an elastic modulus of the sealing member.

7. The method of claim 5, further comprising:

chamfering one or more corners of edge portions of the first mother substrate and the second mother substrate cut by the cutting step.

8. An electrophoretic display device comprising:

a first substrate;

a plurality of electrophoretic sheets formed on the first substrate, each electrophoretic sheet including a second substrate and an electrophoretic layer which is interposed between the first substrate and the second substrate; and a third substrate which is disposed opposite the first substrate with each second substrate interposed between the first substrate and the third substrate, the third substrate being joined to the first substrate with sealing members interposed between the first substrate and the third substrate, and the sealing members sealing the electrophoretic layers with the second substrates interposed between the first substrate and the third substrate, wherein the first substrate and the third substrate have extension sections extending with respect to the second substrates in a plan view, wherein dam members are disposed between the extension sections of the first substrate and the extension sections of the third substrate with gaps surrounded by the extension sections of the first substrate, the extension sections of the third substrate, the electrophoretic sheets, and the dam members, wherein the sealing members fill a part of the gap surrounded by the extension sections of the first substrate, the extension sections of the third substrate, the electrophoretic sheets, and the dam members.

9. The electrophoretic display device according to claim 8, wherein a connection terminal connecting an electrophoretic display panel corresponding to one of the electrophoretic sheets to an external circuit is disposed on at least one of the extension sections of the first substrate corresponding to the electrophoretic display panel, and wherein the extension section in which the connection terminal is disposed is longer than the other extension sections of the first substrate corresponding to the electrophoretic display panel.

* * * * *